United States Patent
Kester

(10) Patent No.: US 10,774,658 B2
(45) Date of Patent: Sep. 15, 2020

(54) INTERIOR COOLING CONFIGURATIONS IN TURBINE BLADES AND METHODS OF MANUFACTURE RELATING THERETO

(71) Applicant: General Electric Company, Schenectady, NY (US)

(72) Inventor: Christopher William Kester, Greenville, SC (US)

(73) Assignee: General Electric Company, Schenectady, NY (US)

( * ) Notice: Subject to any disclaimer, the term of this patent is extended or adjusted under 35 U.S.C. 154(b) by 465 days.

(21) Appl. No.: 15/663,228

(22) Filed: Jul. 28, 2017

(65) Prior Publication Data

US 2019/0032496 A1 Jan. 31, 2019

(51) Int. Cl.

| | |
|---|---|
| *F01D 5/18* | (2006.01) |
| *B22F 7/08* | (2006.01) |
| *B22F 3/105* | (2006.01) |
| *B22F 3/24* | (2006.01) |
| *B22F 5/04* | (2006.01) |
| *B22F 7/06* | (2006.01) |
| *F01D 5/20* | (2006.01) |
| *F01D 5/14* | (2006.01) |
| *B33Y 80/00* | (2015.01) |

(Continued)

(52) U.S. Cl.
CPC .......... *F01D 5/189* (2013.01); *B22F 3/1055* (2013.01); *B22F 3/24* (2013.01); *B22F 5/04* (2013.01); *B22F 7/062* (2013.01); *B22F 7/08* (2013.01); *B33Y 10/00* (2014.12); *B33Y 80/00* (2014.12); *F01D 5/147* (2013.01); *F01D 5/18* (2013.01); *F01D 5/20* (2013.01); *F01D 11/08* (2013.01); *F01D 11/10* (2013.01); *B22F 2003/247* (2013.01); *F01D 5/187* (2013.01); *F05D 2230/21* (2013.01); *F05D 2230/30* (2013.01); *F05D 2240/307* (2013.01); *F05D 2260/201* (2013.01); *F05D 2260/204* (2013.01)

(58) Field of Classification Search
CPC . F01D 5/147; F01D 5/18; F01D 5/187; F01D 5/189; F01D 5/20; F01D 5/225; F01D 11/08; F01D 11/10
See application file for complete search history.

(56) References Cited

U.S. PATENT DOCUMENTS

| | | |
|---|---|---|
| 5,125,798 A | 6/1992 | Muth et al. |
| 5,183,385 A | 2/1993 | Lee et al. |

(Continued)

*Primary Examiner* — Brian P Wolcott
(74) *Attorney, Agent, or Firm* — Charlotte C. Wilson; Hoffman Warnick LLC

(57) ABSTRACT

A rotor blade for use in combustion turbine engine. The rotor blade may include: an airfoil assembled from two radially stacked non-integral sections in which a body section resides inboard of a cap section; an outboard tip of the airfoil that is enclosed by a tip plate having a tip rail; and a cooling configuration that includes cooling channels for directing a coolant through the rotor blade. Each of the cooling channels may include segments, in which: a supply segment extends radially through the airfoil, the supply segment being radially defined between a floor and ceiling; a rail segment extends through an interior of the tip rail; and a connecting segment extends between the supply segment and rail segment. For each of the one or more cooling channels, the ceiling of the supply segment may be defined within the cap section of the airfoil.

17 Claims, 10 Drawing Sheets

(51) Int. Cl.
*B33Y 10/00* (2015.01)
*F01D 11/08* (2006.01)
*F01D 11/10* (2006.01)

(56) References Cited

U.S. PATENT DOCUMENTS

| | | |
|---|---|---|
| 5,660,523 A | 8/1997 | Lee |
| 5,733,102 A | 3/1998 | Lee et al. |
| 5,927,946 A | 7/1999 | Lee |
| 6,494,678 B1 | 12/2002 | Bunker |
| 6,602,052 B2 | 8/2003 | Liang |
| 6,916,150 B2 | 7/2005 | Liang |
| 6,991,430 B2 | 1/2006 | Stec et al. |
| 7,270,514 B2 | 9/2007 | Lee |
| 7,473,073 B1 | 1/2009 | Liang |
| 7,497,660 B2 | 3/2009 | Liang |
| 7,632,062 B2 * | 12/2009 | Harvey .................... F01D 5/20 415/115 |
| 7,740,445 B1 | 6/2010 | Liang |
| 7,922,451 B1 | 4/2011 | Liang |
| 8,079,811 B1 | 12/2011 | Liang |
| 8,142,163 B1 * | 3/2012 | Davies .................... F01D 5/147 416/225 |
| 8,172,507 B2 | 5/2012 | Liang |
| 10,035,223 B2 * | 7/2018 | Ladewig ................. B23P 6/007 |
| 2011/0311389 A1 * | 12/2011 | Ryan .................... B22F 3/1055 419/27 |
| 2019/0264570 A1 * | 8/2019 | Bidaut .................. B23P 15/006 |

\* cited by examiner

INTERIOR COOLING CONFIGURATIONS IN TURBINE BLADES AND METHODS OF MANUFACTURE RELATING THERETO

BACKGROUND OF THE INVENTION

This present application relates to interior cooling channels and configurations of the blades in gas turbine engines. More specifically, but not by way of limitation, the present application relates to interior cooling channels and structural configurations formed near the outer radial tip of turbine rotor blades.

It will be appreciated that combustion or gas turbine engines ("gas turbines") include compressor and turbine sections in which rows of blades are axially stacked in stages. Each stage includes a row of circumferentially-spaced stator blades, which are fixed, and a row of rotor blades, which rotate about a central turbine axis or shaft. In operation, generally, the compressor rotor blades rotate about the shaft, and, acting in concert with the stator blades, compress a flow of air. The supply of compressed air then is used in a combustor to combust a supply of fuel. The resulting flow of hot expanding gases from the combustion, i.e., the working fluid, is expanded through the turbine section of the engine. The flow of working fluid through the turbine is redirected by the stator blades onto the rotor blades so to induce rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, such that the supply of compressed air needed for combustion is produced, and the coils of a generator, such that electrical power is generated. During operation, because of the extreme temperatures of the hot-gas path, the velocity of the working fluid, and the rotational velocity of the engine, the blades within the turbine become highly stressed with extreme mechanical and thermal loads.

The engineering of efficient and cost-effective gas turbines is an ongoing and significant objective. While several strategies for increasing the efficiency of gas turbines are known, it remains a challenging objective because such alternatives—which, for example, include increasing the size of the engine, increasing the temperatures through the hot-gas path, and increasing the rotational velocities of the rotor blades—generally place additional strain on blades and other hot-gas path components parts that are already highly stressed. As a result, improved apparatus, methods or systems that reduce operational stresses placed on turbine blades or allow the turbine blades to better withstand these stresses so that the engines may operate more efficiently remain a significant area for technological improvement.

One strategy for alleviating the stresses on the blades is through actively cooling them during operation. Such cooling may allow the blades to better withstand higher firing temperatures and mechanical stresses, which may extend the life of the blades and generally make the engine more cost-effective and efficient to operate. One way to cool blades during operation is through the use of internal cooling channels or circuits. Generally, this involves passing a relatively cool supply of compressed air derived from the compressor through internal cooling channels. For a number of reasons, as will be appreciated, great care is required in designing and manufacturing these interior cooling channels.

First, the use of cooling air decreases the efficiency of the engine. Specifically, air from the compressor that is diverted for cooling purposes is air that otherwise could be used in the combustion process. As a result, the usage of such air necessarily decreases the air available for combustion and, thereby, decreases overall efficiency. This mandates that cooling channels be highly efficient so that air usage for cooling is minimized. Second, newer turbine blade design calls for aggressively shaped, aerodynamic configurations, which are thinner and more curved or twisted. These new blade configurations place a further premium on compact and efficient channels. These new designs also create spatial constraints that hinder or constrain the manufacture of traditional cooling channel configurations using conventional approaches. Third, interior cooling channels must be configured to promote light-weight rotor blades while still providing robust enough structure for withstanding extreme loading. That is to say, while cooling channel design is an effective way to reduce the overall weight of the blade—which promotes efficiency and reduces mechanical loads—the blades must still remain very resilient. Cooling channels, therefore, must be designed to both remove material and weight while still promoting structural resilience. Internal arrangements must also avoid stress concentrations or inadequately cooled regions (or "hot spots") that may negatively impact part-life. Fourth, cooling configurations must also be designed so that discharged coolant promotes surface cooling and efficient, aerodynamic operation. Specifically, because cooling channels typically discharged coolant into the working fluid flowpath after circulating through the internal cooling channels, another design consideration concerns the use of discharged coolant for surface cooling as well as minimizing the aerodynamic loses associated therewith. The ejected coolant is often counted on to provide cooling to outer surfaces or regions of the blade after its release, and this must both dovetail with internal cooling strategies and take into account aerodynamic performance.

As will be appreciated, according to these and other criteria, the design of internal cooling configurations within turbine blades includes many complex, often competing considerations. Novel designs that balance these in a manner that optimizes or enhances one or more desired performance criteria—while still adequately promoting structural robustness, part-life longevity, cost-effective engine operation, and the efficient usage of coolant—represent significant technological advances.

BRIEF DESCRIPTION OF THE INVENTION

The present application thus describes a rotor blade for use in combustion turbine engine. The rotor blade may include: an airfoil assembled from two radially stacked non-integral sections in which a body section resides inboard of a cap section; an outboard tip of the airfoil that is enclosed by a tip plate and, formed along a periphery of the tip plate, a tip rail; and a cooling configuration that includes one or more cooling channels for receiving and directing a coolant through an interior of the rotor blade. Each of the one or more cooling channels may include fluidly communicative, sequential segments, in which: a supply segment extends radially through the airfoil, the supply segment being radially defined between a floor, which is an inboard boundary, and a ceiling, which is an outboard boundary; a rail segment extends through an interior of the tip rail; and a connecting segment extends between the supply segment and the rail segment, the connecting segment including an upstream port, which connects to the supply segment, and a downstream port, which connects to the rail segment. For each of the one or more cooling channels, the ceiling of the supply segment may be defined within the cap section of the airfoil.

The present application further discloses a method of manufacturing an airfoil of a rotor blade for use in a combustion turbine engine. The airfoil may include two radially stacked non-integral sections: a body section that resides inboard of a cap section. The airfoil may extend radially between an inboard end, which is defined by the body section, and an outboard tip, which is defined by the cap section. The method may include the steps of: generating a digital model of the cap section; inputting the digital model of the cap section into an additive manufacturing machine; and using the additive manufacturing machine to print the cap section based on the digital model.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
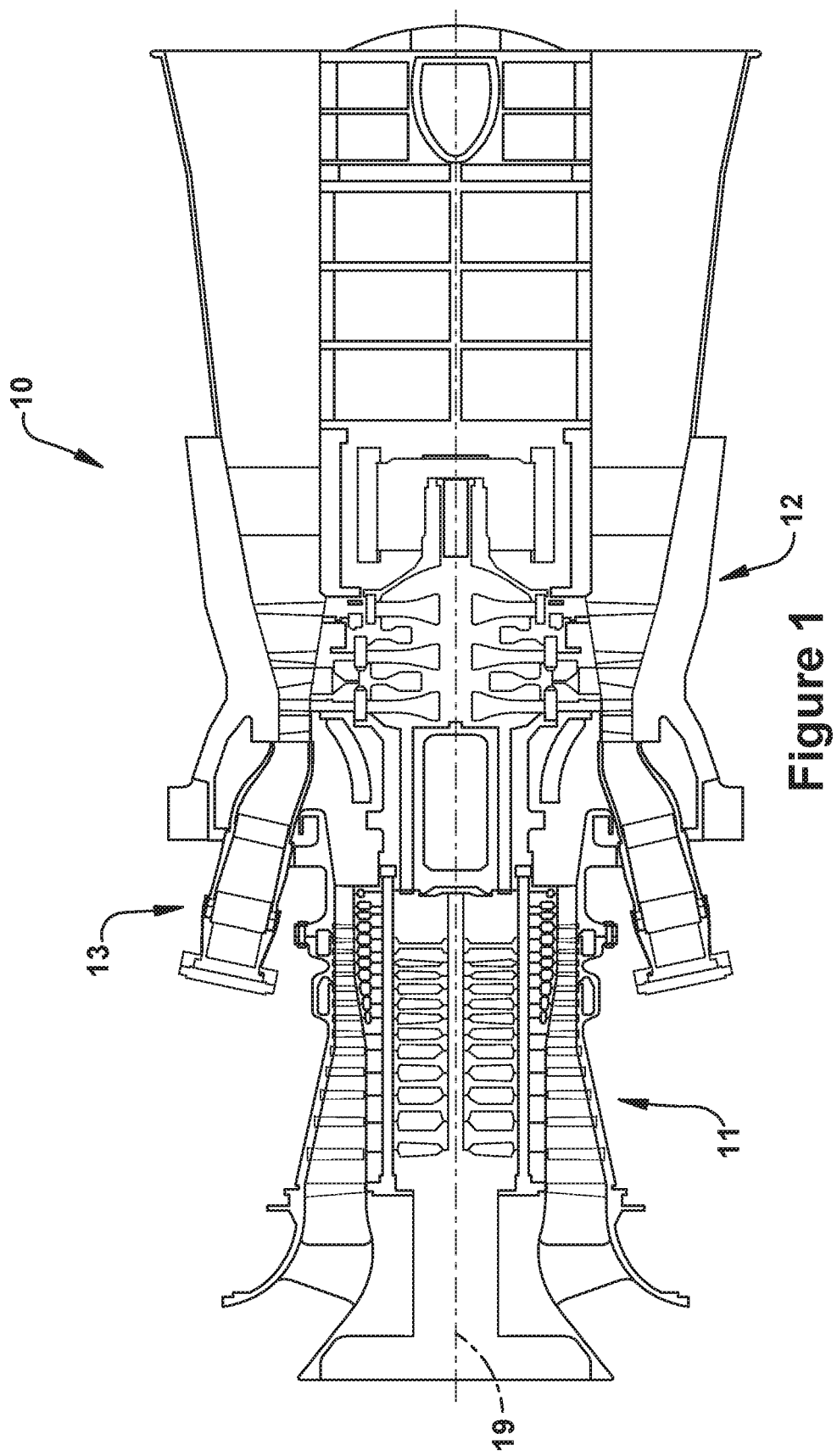
FIG. 1 is a schematic representation of an exemplary gas turbine that may include turbine blades according to aspects and embodiments of the present application.

Aspects and advantages of the present application are set forth below in the following description, or may be obvious from the description, or may be learned through practice of the invention. Reference will now be made in detail to present embodiments of the invention, one or more examples of which are illustrated in the accompanying drawings. The detailed description uses numerical designations to refer to features in the drawings. Like or similar designations in the drawings and description may be used to refer to like or similar parts of embodiments of the invention. As will be appreciated, each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. It is intended that the present invention covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on the terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. In understanding the scope of the present invention, attention should not only be paid to the particular terminology used, but also to the accompanying description and context, as well as the structure, configuration, function, and/or usage of the component being referenced and described, including the manner in which the term relates to the several figures, as well as, of course, the precise usage of the terminology in the appended claims. Further, while the following examples are presented in relation to certain types of gas turbines or turbine engines, the technology of the present application also may be applicable to other categories of turbine engines, without limitation, as would the understood by a person of ordinary skill in the relevant technological arts. Accordingly, it should be understood that, unless otherwise stated, the usage herein of the term "gas turbine" is intended broadly and with limitation as the applicability of the present invention to the various types of turbine engines.

Given the nature of how gas turbines operate, several terms prove particularly useful in describing certain aspects of their function. These terms and their definitions, unless specifically stated otherwise, are as follows. As will be understood, such terms may be used both in describing or claiming the gas turbine or one of its primary subsystems—i.e., the compressor, combustor, or turbine—as well as to describe or claim components or subcomponents for usage therewithin. In the latter case, the terminology should be understood as describing those components as they would be upon proper installation and/or function within the gas turbine engine or primary subsystem.

Accordingly, the terms "forward" and "aftward" refer to directions relative to the orientation of the gas turbine and, more specifically, the relative positioning of the compressor and turbine sections of the engine. Thus, as used therein, the term "forward" refers to the compressor end while "aftward" refers to the turbine end. It will be appreciated that each of these terms may be used to indicate direction of movement or relative position along the central axis of the engine. As stated above, these terms may be used to describe attributes of the gas turbine or one of its primary subsystems, as well as for components or subcomponents positioned therewithin. Thus, for example, when a component, such as a rotor blade, is described or claimed as having a "forward face", it may be understood as referring to a face oriented in the forward direction as defined by the orientation of the gas turbine (i.e., the positioning of the combustor and turbine subsystems). Unless otherwise stated, this assumption holds for the following descriptive terms as well.

The terms "downstream" and "upstream" are used herein to indicate position within a specified conduit or flowpath relative to the direction of flow (hereinafter "flow direction") moving through it. Thus, the term "downstream" refers to the direction in which a fluid is flowing through the specified conduit, while "upstream" refers to the direction opposite that. These terms may be construed as relating to what would be understood by one skilled in the art as the flow direction through the conduit given normal or anticipated operation. As will be appreciated, within the compressor and turbine sections of the gas turbine, the working fluid is directed downstream and through an annularly shaped working fluid flowpath, which is typically defined about the central and common axis of the gas engine. As such, within the compressor and turbine sections of the engine, the term "flow direction", as used herein, refers to a reference direction representing an idealized or generalized direction of flow of working fluid through the working fluid flowpath of the engine during an expected or normal condition of operation. Thus, within the compressor and turbine sections, the "flow direction" terminology is referring to flow that is parallel to the central axis of the gas turbine and oriented in the downstream or aftward direction.

Accordingly, for example, the flow of working fluid through the working fluid flowpath of the gas turbine may be described as beginning as air pressurized through the compressor per the flow direction, becoming combustion gases in the combustor upon being combusted with a fuel, and, finally, being expanded per the flow direction as it passed through the turbine. Likewise, the flow of working fluid may be described as beginning at a forward or upstream location toward a forward or upstream end of the gas turbine, moving generally in a downstream or aftward direction, and, finally, terminating at an aftward or downstream location toward an aftward or downstream end of the gas turbine.

As many components of gas turbines rotate during operation, such as compressor and turbine rotor blades, the terms rotationally lead and rotationally trail may be used to delineate relative positioning of subcomponents or subregions per the expected rotation within the engine. Thus, as will be appreciated, these terms may differentiate position per the direction of rotation (hereinafter "rotation direction") within the compressor or turbine. As used herein, such rotation direction may be understood as being the expected direction of rotation for a component given normal or anticipated operation of the gas turbine.

In addition, given the configuration of gas turbines, particularly the arrangement of the compressor and turbine sections about a common shaft or rotor, as well as the cylindrical configuration common to many combustor types, terms describing position relative to an axis may be regularly used herein. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as either "radially inward" or "inboard" of the second component. If, on the other hand, the first component resides further from the central axis, the first component will be either "radially outward" or "outboard" of the second component. As used herein, the term "axial" refers to movement or position parallel to an axis, while the term "circumferential" refers to movement or position around an axis. Unless otherwise stated or plainly contextually apparent, these terms should be construed as relating to the central axis of the compressor and/or turbine sections of the gas turbine as defined by the rotor extending through each, even if the terms are describing or claiming attributes of non-integral components—such as rotor or stator blades—that function therein. When otherwise stated, the terms may be used relative to the longitudinal axis of certain components or subsystems within the gas turbine, such as, for example, the longitudinal axis around which conventional cylindrical or "can" combustors are typically arranged.

Finally, the term "rotor blade", without further specificity, is a reference to the rotating blades of either the compressor or the turbine, and so may include both compressor rotor blades and turbine rotor blades. The term "stator blade", without further specificity, is a reference to the stationary blades of either the compressor or the turbine and so may include both compressor stator blades and turbine stator blades. The term "blades" may be used to generally refer to either type of blade. Thus, without further specificity, the term "blades" is inclusive to all type of turbine engine blades, including compressor rotor blades, compressor stator blades, turbine rotor blades, turbine stator blades and the like.

Figure 2:
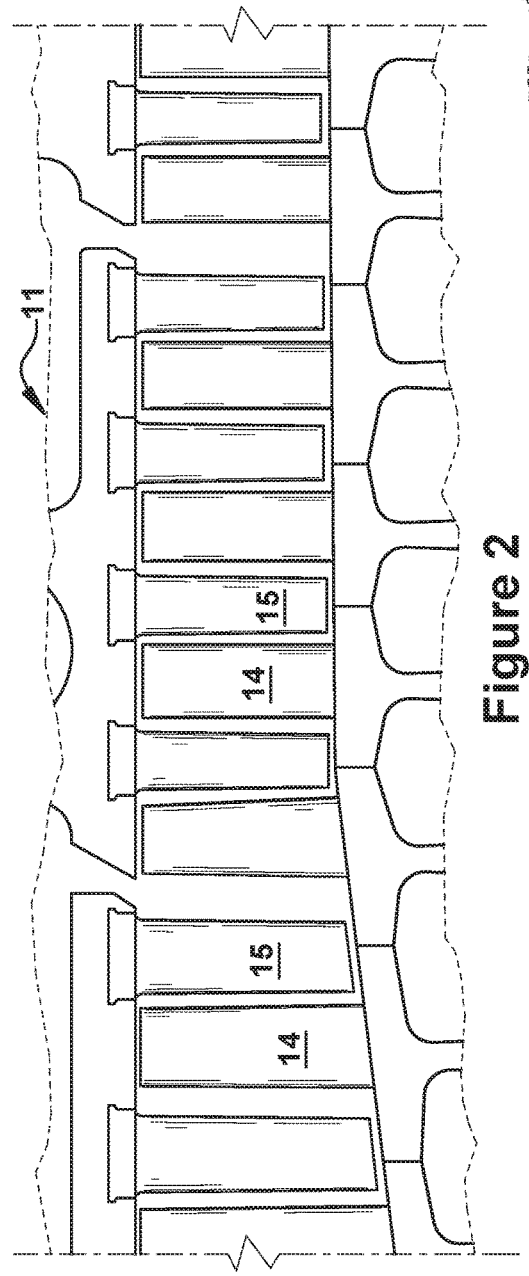
FIG. 2 is a sectional view of the compressor section of the gas turbine of FIG. 1.
Figure 3:
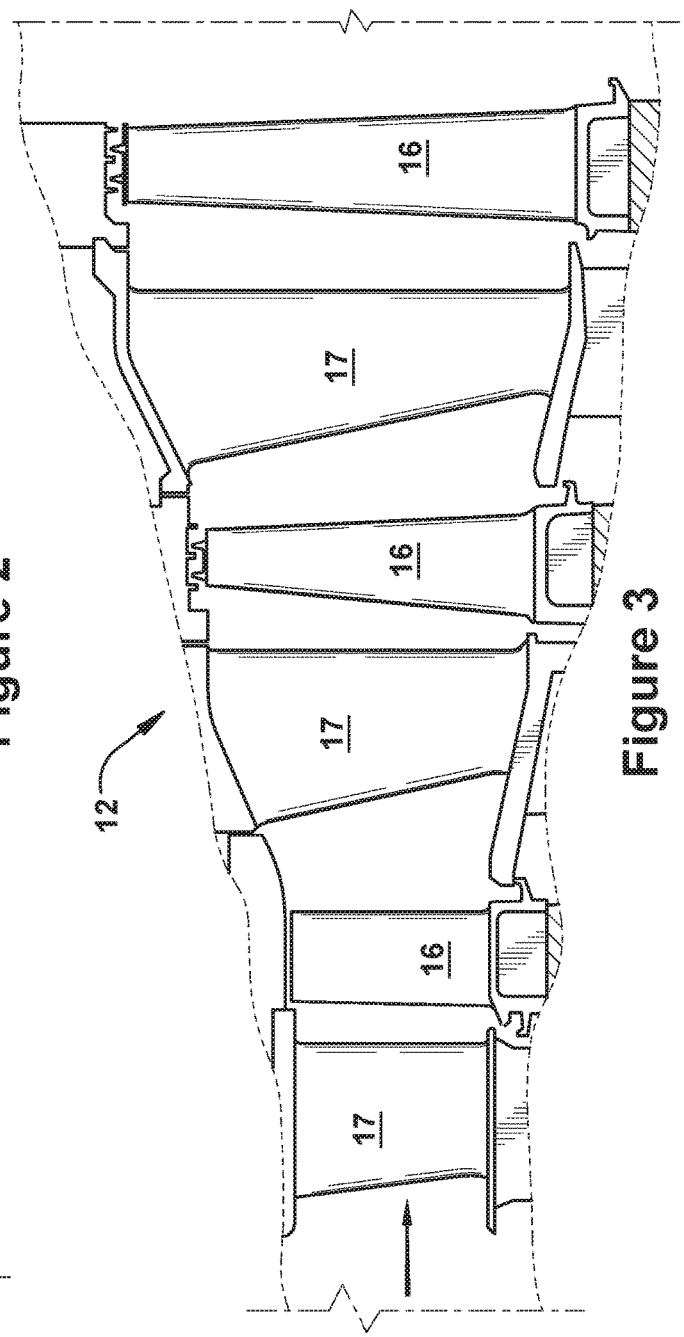
FIG. 3 is a sectional view of the turbine section of the gas turbine of FIG. 1.

By way of background, referring now with specificity to the figures, FIGS. 1 through 3 illustrate an exemplary gas turbine in accordance with the present invention or within which the present invention may be used. It will be understood by those skilled in the art that the present invention may not be limited to this type of usage. As stated, the present invention may be used in gas turbines, such as the engines used in power generation and airplanes, steam turbine engines, as well as other types of rotary engines as would be recognized by one of ordinary skill in the art. The examples provided, thus, are not meant to be limiting unless otherwise stated. FIG. 1 is a schematic representation of a gas turbine 10. In general, gas turbines operate by extracting energy from a pressurized flow of hot gas produced by the combustion of a fuel in a stream of compressed air. As illustrated in FIG. 1, gas turbine 10 may be configured with an axial compressor 11 that is mechanically coupled by a common shaft or rotor to a downstream turbine section or turbine 12, and a combustor 13 positioned between the compressor 11 and the turbine 12. As illustrated in FIG. 1, the gas turbine may be formed about a common central axis 19.

FIG. 2 illustrates a view of an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation. FIG. 3 illustrates a partial view of an exemplary turbine section or turbine 12 that may be used in the gas turbine of FIG. 1. The turbine 12 also may include a plurality of stages. Three exemplary stages are illustrated, but more may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and, for example, a generator to produce electricity.

Figure 6:
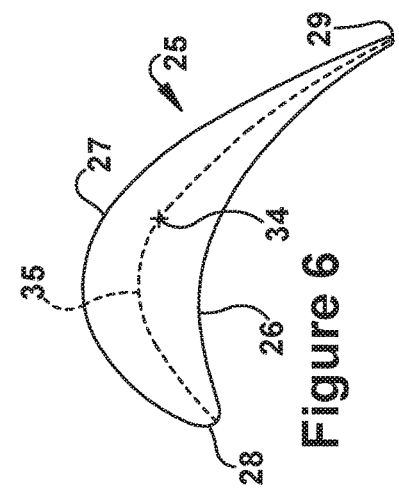
FIG. 6 is a section view along sight line 6-6 of FIG. 4.
Figure 7:
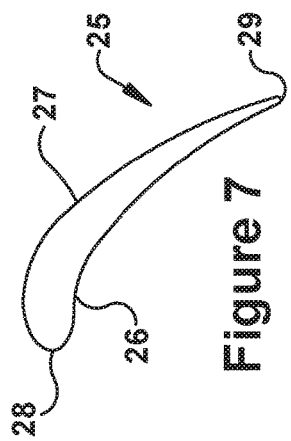
FIG. 7 is a section view along sight line 7-7 of FIG. 4.
Figure 5:
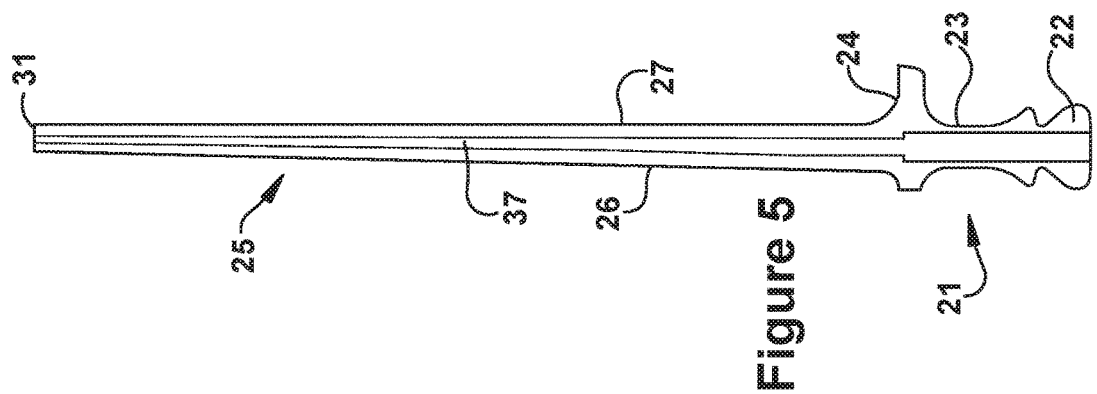
FIG. 5 is a section view along sight line 5-5 of FIG. 4.
Figure 4:
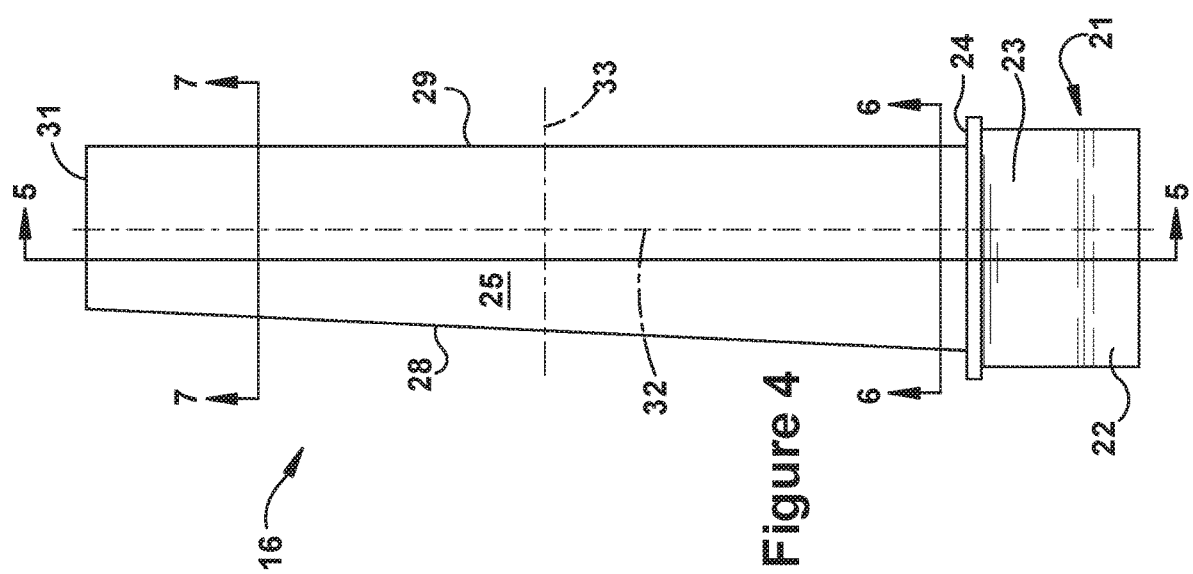
FIG. 4 is a side view of an exemplary turbine rotor blade that may include an internal cooling configuration and structural arrangement according to aspects and embodiments of the present application.

For background purposes, FIGS. 4 through 7 provide views of a turbine rotor blade 16 in accordance with or within which aspects of the present invention may be practiced. As will be appreciated, these figures are provided to illustrate common configurations of rotor blades and delineate spatial relationships between components and regions within such blades for later reference, while also describing geometric constraints and other criteria that affect the internal and external design thereof. While the blade of this example is a rotor blade, it will be appreciated that, unless otherwise stated, the present invention also may be applied to other types of blades within the gas turbine. As stated above, description of such components may include terminology that derives meaning based on the orientation and function of the gas turbine engine and, more specifically, the working fluid flowpath, and, thus, should be understood in that context, i.e., that such description assumes the rotor blade is properly installed and operating under anticipated or normal conditions within the engine. Specifically, FIG. 4 is a side view of an exemplary turbine rotor blade that may include an internal cooling configuration and structural arrangement according to aspects and embodiments of the present invention, while FIGS. 5 through 7 provide section views along the corresponding sightlines shown in FIG. 4.

The rotor blade 16, as illustrated, may include a root 21 that is configured for attaching to a rotor disc. The root 21, for example, may include a dovetail 22 configured for mounting in a corresponding dovetail slot in the perimeter of a rotor disc. The root 21 may further include a shank 23 that extends between the dovetail 22 and a platform 24. The platform 24, as shown, generally forms the junction between the root 21 and an airfoil 25, which is the active component of the rotor blade 16 that intercepts the flow of working fluid through the turbine 12 and induces the desired rotation. The platform 24 may define the inboard end of the airfoil 25. The platform also may define a section of the inboard boundary of the working fluid flowpath through the turbine 12.

The airfoil 25 of the rotor blade may typically include a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip 31. The airfoil 25 may include a curved or contoured shape that that is designed for promoting desired aerodynamic performance. As illustrated in FIGS. 4 and 5, the shape of the airfoil 25 may taper gradually as it extends between the platform 24 and the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the pressure face 26 and the suction face 27, as illustrated in FIG. 5. As shown in FIGS. 6 and 7, the contoured shape of the airfoil 25 may further include a twisting about the longitudinal axis of the airfoil 25 as it extends from the platform 24. As will be appreciated, this twisting may be included so to vary a stagger angle for the airfoil 25 gradually between the inboard end or platform 24 and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including radially stacked sections, for example, radial stacked section defined inboard and outboard of a radial midline 33 of the airfoil 25. Thus, in this example, an inboard section or half of the airfoil 25 extends between the platform 24 and the radial midline 33, while an outboard section or half extends between the radial midline 33 and the outboard tip 31. Finally, the airfoil 25 may be described as including a pressure face section or half and a suction face section or half, which, as will be appreciated, are defined to each side of the camber line 35 of the airfoil 25 and the corresponding face 26, 27 of the airfoil 25.

As discussed more below, the rotor blade 16 may further include an internal cooling configuration having one or more cooling channels 37 through which a coolant is circulated during operation. Such cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
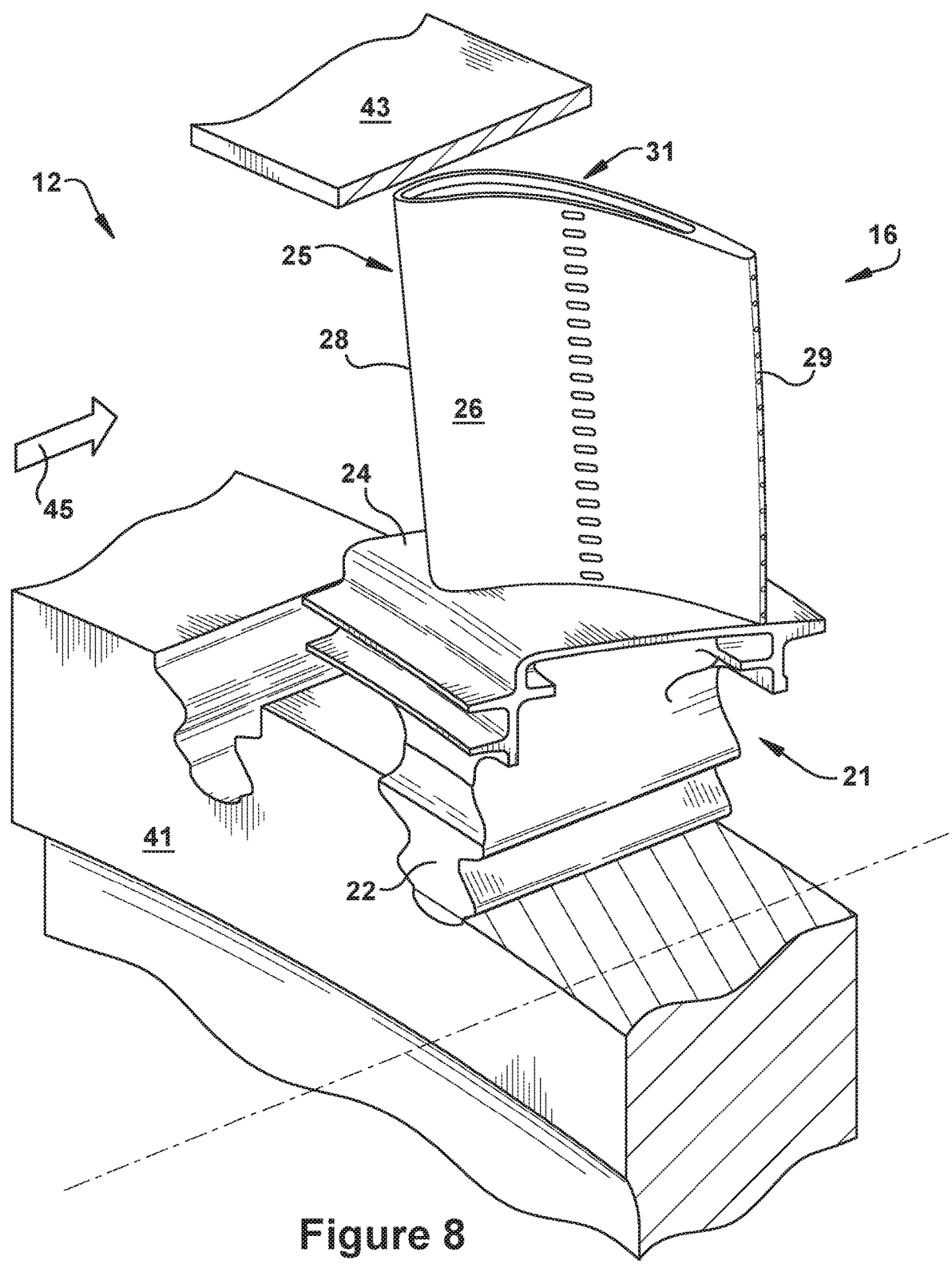
FIG. 8 is a perspective view of an exemplary rotor blade assembly including a rotor, a turbine blade, and a stationary shroud.

With reference now to FIG. 8, a perspective view of an alternative rotor blade 16 is depicted assembled in an exemplary hot gas flowpath arrangement within a turbine 12. As will be appreciated, the turbine 12, which is formed axisymmetrical about an axial central axis, includes a rotor disc 41 and, attached thereto, a plurality of circumferentially spaced turbine rotor blades 16 (only one of which is shown) extending radially outwardly from the rotor disc 41. An annular stationary shroud 43 may be suitably joined to a turbine casing (not shown). The stationary shroud 43 generally surrounds the rotor blades 16 such that a relatively small clearance or gap remains therebetween, which limits leakage of combustion gases during operation. As already described, each rotor blade 16 generally includes a root 21, which may have any conventional form, such as an axial dovetail 22 configured for being mounted in a corresponding dovetail slot in the perimeter of the rotor disc 41. The airfoil 25 may be integrally joined to the root 21 and extend radially or longitudinally outwardly therefrom. The rotor blade 16 also may include a platform 24 disposed at the junction of the airfoil 25 and the root 21. The platform 24 may define a portion of the radially inner boundary of the hot gas flowpath for the combustion gases 45 moving there through.

Figure 9:
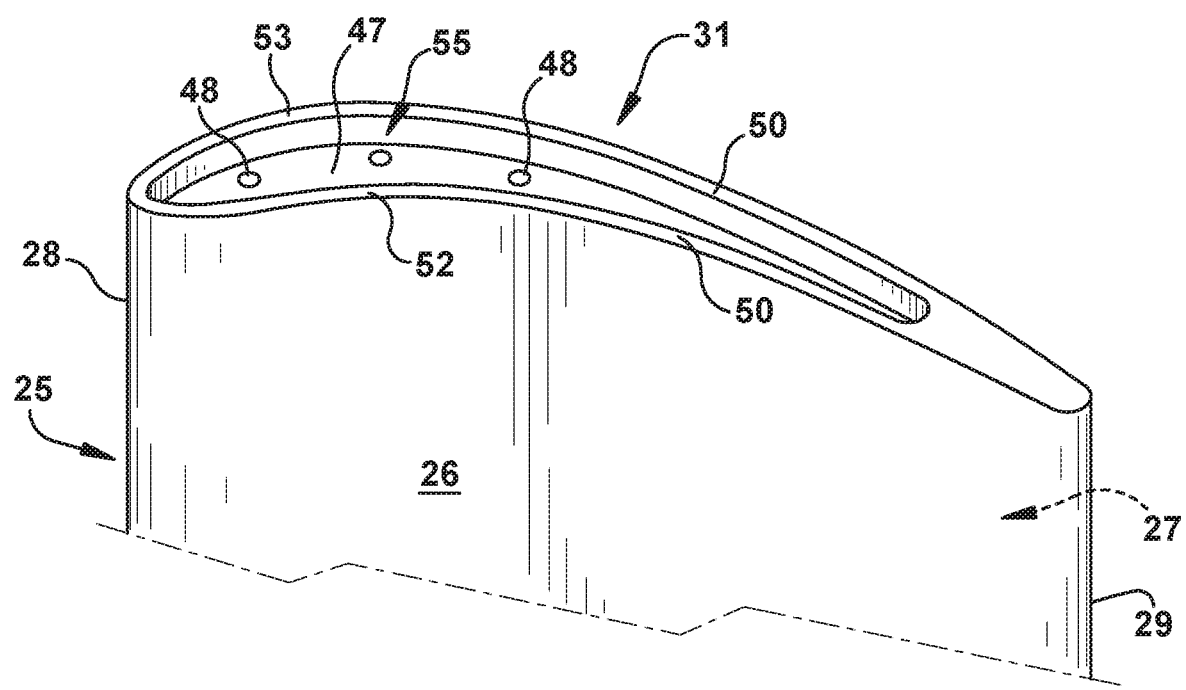
FIG. 9 is a perspective view of the outboard tip of a rotor blade in accordance with embodiments of the present application.

With reference now to FIG. 9, an enhanced view of an outboard tip 31 of an exemplary rotor blade 16 is shown. In general, the outboard tip 31 includes a tip plate 47 disposed atop the radially outer or outboard edges of the pressure 26 and suction faces 27. In general, the tip plate 47 is a planar component that extends axially and circumferentially to connect the outboard edge of the suction face 27 to the outboard edge of the pressure face 26. The tip plate 47 typically provides an outer radial boundary for internal cooling passages or channels that are defined through the interior of the airfoil 25. A coolant, such as compressed air bled from the compressor, may be circulated through the such cooling passages during operation. In some cases, the tip plate 47 includes film cooling outlets 48 that release cooling during operation and promote film cooling over the outer surface of the airfoil 25.

Due to certain performance advantages, such as reduced leakage flow, the outboard tip 31 frequently includes a rail or, as used herein, a "tip rail" 50. Coinciding with the pressure face 26 and the suction face 27, the tip rail 50 may be described as including a pressure tip rail 52 and a suction tip rail 53, respectively. Generally, the tip rail 50 protrudes radially from the tip plate 47 at a steep angle, for example, the tip rail 50 may form an angle of approximately 90° with the tip plate 47. As illustrated, the path of pressure tip rail 52 may be adjacent to or very near the outboard edge of the pressure face 26 (i.e., at or near the periphery of the tip plate 47 to that side of the airfoil 25). The pressure tip rail 52 may extend along a longitudinal axis from the leading edge 28 to the trailing edge 29 of the airfoil 25. Similarly, the path of the suction tip rail 53 may be adjacent to or very near the outboard edge of the suction face 27 (i.e., at or near the periphery of the tip plate 47 to that side of the airfoil 25). The suction tip rail 53 may extend along a longitudinal axis from the leading edge 28 to the trailing edge 29 of the airfoil 25. Though not shown, gaps may form within the tip rail 50 for various performance reasons. Also, as used herein, a trailing edge 61 of the tip rail 50 is the trailing edge interface at which the pressure tip rail 52 intersects the suction tip rail 53. That is, the trailing edge 61 of the tip rail 50 overhangs the trailing edge 29 of the airfoil 25.

Figure 13:
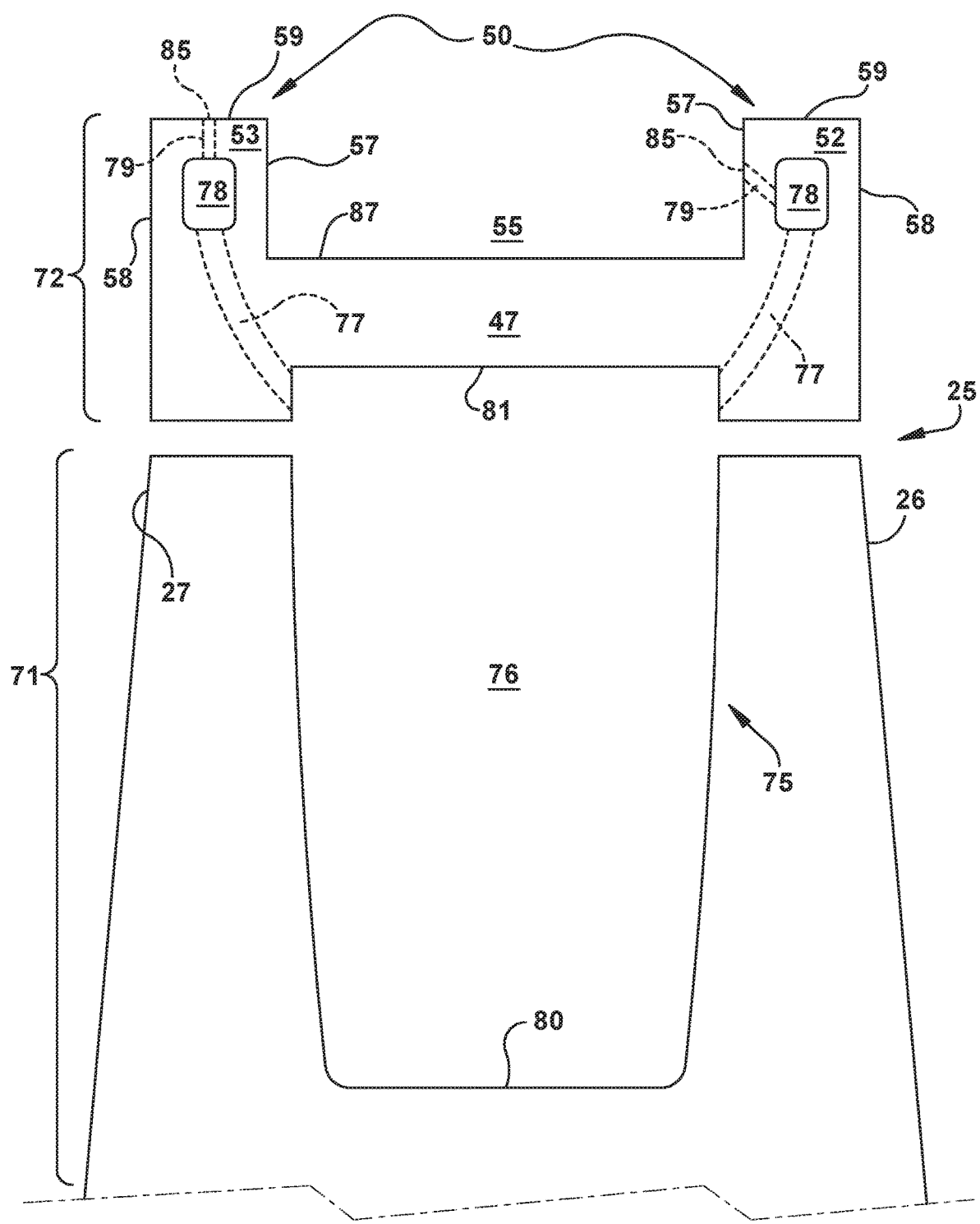
FIG. 13 is a section view of an unassembled airfoil according to an exemplary embodiment of the present invention.

The tip rail 50, as used herein, may be described as forming a tip cavity 55 on the outboard tip 31 of the airfoil 25. As will be appreciated, such a configuration is often referred to as a "squealer tip" or "squealer cavity." The height and width of the pressure tip rail 52 and/or the suction tip rail 53 (and thus the depth of the tip cavity 55) may vary depending on best performance and/or the size of the overall rotor blade and other characteristics. In regard to the tip cavity 55, it will be appreciated that an outboard surface of the tip plate 47 defines an inner radial boundary or floor of the tip cavity 55. As shown in FIG. 13, the tip rail 50 may be further described as having an inner rail face 57 and an outer rail face 58. An outboard rail face 59 may connect the inner rail face 57 and the outer rail face 58 and thereby define an outer radially most edge or face of the tip rail 50.

The inner rail face 57 of the tip rail 50 is so-called because it faces into the tip cavity, and thus, laterally defines or forms the sidewalls of the tip cavity 55. The tip cavity 55 may remain open through an outer radial face. Once installed within a turbine engine, the open outer radial face of the tip cavity 55 is positioned just opposite and near the stationary shroud 43 (as shown in FIG. 8).

Figure 10:
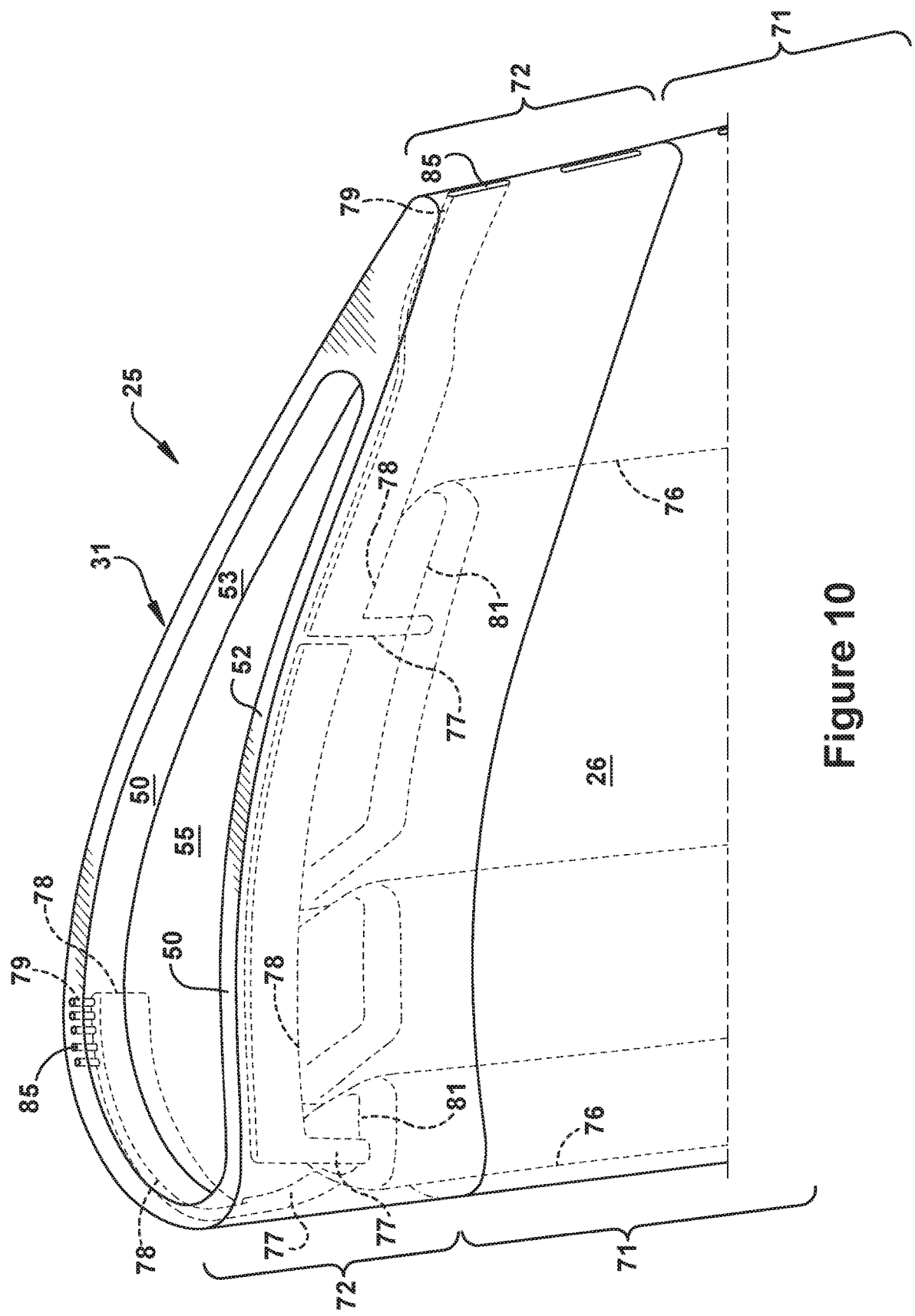
FIG. 10 is a transparent perspective view of an outboard tip of a rotor blade in accordance with embodiments of the present application.

With reference now to FIGS. 10 through 13, several airfoils of turbine rotor blades are illustrated in accordance with exemplary embodiments of the present invention. Specifically, FIG. 10 shows a transparent view of the outer radial region of an exemplary airfoil, including the outboard tip thereof, while FIGS. 11 and 12 focuses on particular areas of the outboard tip. Additionally, FIG. 13 provides a sectional view of the outer radial region of an exemplary airfoil of the present invention at is may appear in a disassembled state.

As disclosed in these several figures, the present invention includes a rotor blade airfoil that is assembled from two radially stacked non-integral sections, in which a body section resides inboard of an outer radially cap or, as used herein, a "cap section". The present disclosure further describes a novel cooling configuration within the cap section in which the tip rails are advantageously cooled by internal channels formed therein, which will be referred to herein as "rail segments". As will be seen, the rail segments extend in a chordwise direction through the interior of the tip rails, and may be constructed in either the suction or pressure tip rails and supplied with coolant from internal supply channels or segments that extend through the body section of the airfoil. The cross-sectional shape, length and exhaust locations associated the rail segments can be conveniently tailored to address specific cooling problem areas or hotspots on the tip rails. Further, exhaust ports or outlet segments may be formed that connect to the rail segments to address exterior regions with film cooling. This may be done via a cost-effective drilling procedure after the manufacture of the cap section is complete. Such outlets may be used to provide cooling air to the squealer pocket in order to cool the tip plate or opposite tip rail.

As will be discussed in relation to FIG. 14, the present disclosure further describes methods for the efficient and cost-effective manufacture of such rotor blade airfoils. Specifically, methods of manufacture are disclosed by which an airfoil having a non-integral cap section is produced by using printing or additive manufacturing processes to make the cap section separately from the manufacture of the body section. Specifically, the cap section may be manufactured via additive manufacturing processes, while the body section is made using conventional casting processes. In this manner, more complicated cooling channel configurations may be made within the cap section than would otherwise be impossible if the cap section were cast with the remainder of the blade. For example, if the cap section is made with the more exacting additive manufacturing processes, the rail segments may be configured to include more detailed features, such as turbulators or pin banks, which may be used to enhance the level of convective cooling through the tip rail. Further, with the more precise capabilities of additive manufacturing, the rail segments may be constructed nearer to the outer surface of the tip rail than casting processes would allow. The rail segments also may be constructed with more complex cross-sectional profiles and/or reduced crosssectional flow areas. The disclosed manufacturing processes of the present invention further allow for greater tunability of the cooling configuration, which allows a level of design variability to meet changing demands. In sum, the rail segments and related cooling channels formed in the cap section of the airfoil may appreciably enhance the effectiveness of coolant and, thereby, increase engine efficiency by reducing the amount needed. In general, more effective cooling configurations reduce local metal temperatures along the length of the tip rail, which may increase the resistance of the tip rail to oxidation and cracking. Further, the rail segments may be located to control temperature gradients, which are cause low-cycle fatigue. Additionally, aspects of the present invention may be used to produce an airfoil having different materials in the body section and the cap section.

With specific reference now to FIGS. 10 through 13, the rotor blade of the present invention may include an airfoil 25 assembled from two radially stacked non-integral sections. As already mentioned, the two radially stacked sections may include a body section 71 and cap section 72. As shown, the body section 71 resides inboard of the cap section 72. Consistent with the already discussed concepts regarding the design of rotor blades and related componentry, the airfoil 25 extends radially between an inboard end (which may be defined by the platform 24) and the outboard tip 31. The inboard end of the airfoil 25 may be defined by an inboard edge of the body section 71, while the outboard tip 31 of the airfoil 25 may be defined by an outboard edge of the cap section 72. As discussed more below, the outboard tip 31 of the airfoil 25 may be enclosed by a tip plate 47 and, formed along a periphery of the tip plate 47, the outboard tip 31 may include a tip rail 50.

As disclosed herein, the body section 71 and the cap section 72 are each radially defined sections of the airfoil 25, and preferably, the body section 71 and the cap section 72 together form an entirety of the airfoil 25. As used herein, a radial height of the airfoil 25 is defined as the total height of the airfoil 25 or the distance between the inboard end 24 and the outboard tip 31 of the airfoil 25. Thus, in accordance with preferred embodiments, the radial height of the body section 71 plus the radial height of the cap section 72 are equal to the radial height of the airfoil 25. Put another way, the body section 71 and the cap section 72 equal a first percentage and a second percentage, respectively, of the radial height of the airfoil 25. According to exemplary embodiments, the first percentage of the body section 71 is at least 85%, while the second percentage of the cap section 72 is at least 3%. More preferably, the first percentage of the body section 71 is at least 90%, while the second percentage of the cap section 72 is at least 5%. As described more below, the body section 71 of the airfoil 25 may be manufactured via a traditional casting process. Specifically, the body section 71 of the airfoil 25 may be integrally formed with the root 21 of the rotor blade via casting processes. On the other hand, the cap section 72 of the airfoil 25 may be separately constructed via an additive manufacture process.

The airfoil 25 may have an interior cooling configuration in which one or more cooling channels 75 are provided for receiving and directing a coolant through the interior of the airfoil. According to present disclosure, each of the cooling channels 75 within the cooling configuration may include fluidly communicative and sequential interior channels or, as used herein, "segments". In exemplary embodiments, these segments include: a supply segment 76; a connecting segment 77; and a rail segment 78. According to alternative configurations, as discussed further below, the cooling channels 75 may also include outlet segments 79. As will be seen, the segments of each of the cooling channels 75 may be end-to-end or sequentially connected. The plurality of outlet segments 79 associated with each of the cooling channels 75 may be connected in parallel in relation to each other. Thus, as will be appreciated, the supply segment 76 is positioned upstream of the connecting segment 77, the connecting segment 77 is positioned upstream of the rail segment 78, and the rail segment 78 is positioned upstream of each of the outlet segments 79. Thus, the coolant may be supplied through the supply segment 76, then flow through the connecting segment 77, then flow through the rail segment 78, and finally be expelled from the airfoil 25 through the outlet segments 79. As will be appreciated, the flow direction indicated by this description may be used to interpret relative "upstream" and "downstream" locations.

According to exemplary embodiments, the supply segment 76 extends radially through the airfoil 25 and connects to a coolant source through the root 21 of the rotor blade. As specifically indicated in FIG. 13, the supply segment 76 may be radially defined between a floor 80, which represents an inboard boundary, and a ceiling 81, which represents an outboard boundary. According to exemplary embodiments, for each of the cooling channels 75 of the cooling configuration, the floor of the supply segment 76 may be located within and defined by the body section 71 of the airfoil 25, while the ceiling 81 of the supply segment 76 may be located within and defined by the cap section 72 of the airfoil 25. In this manner, the cap section 72 may enclose the supply segment 76 once it is connected to the body section 71. More generally, the supply segment 76 also may be described as extending radially and uninterrupted between a first position, which is disposed within the body section 71, and a second position, which is disposed within the cap section 72.

As discussed more below, the rail segment 78 generally extends through an interior of the tip rail 50, while the connecting segment 77 connects the rail segment 78 to the supply segment 76. Specifically, the connecting segment 77 may extend between an upstream port, which connects to the supply segment 76, and a downstream port, which connects to the rail segment 78. As stated, each of the cooling channels 75 may further include outlet segments 79. The outlet segments 79 may be configured to extend between an upstream port, which connects to the rail segment 78, and a downstream outlet 85 formed on one of the outer surfaces of the tip rail 50.

The rail segment 78, as illustrated, is the portion of the cooling channel 75 that extends within and through the interior of the tip rail 50. As indicated, the outboard tip 31 of the airfoil 25 may include a tip rail 50 formed about a periphery of the tip plate 47. According to exemplary embodiments, the tip rail 50 may be configured in accordance with any of the concepts already discussed herein. For each of the cooling channels 75 of the cooling configuration, the rail segment 78 may be configured to extend in a chordwise direction, which may also be described as extending along the length of the tip rail 50. In other words, the rail segment 78 may be configured such that the longitudinal axis of the rail segment 78 is generally parallel to the longitudinal axis of the tip rail 50 that it extends through.

Contained within the tip rail 50 in this manner, the rail segment 78 may also be described as extending in an aftward direction, i.e., toward the trailing edge of the airfoil 25, from a forward starting point. For each of the cooling channels 75, the rail segment 78 may generally extend from a first position within the interior of the tip rail 50 to a second position within the interior of the tip rail 50, where the first position is one that is closer to the leading edge of the airfoil 25 than the second position. Further, for each of the cooling channels 75, the first position of the rail segment 78 may constitute an upstream position relative to the second position of the rail segment 78. As will be appreciated, the upstream/downstream orientation is determined relative to an expected direction of flow of coolant through the rail segment 78 during normal operation.

Though other configurations are possible, as indicated in FIG. 13, the rail segment 78 may be approximately centered within the tip rail 50. Alternative non-centered configurations may be used, for example, to address a known hotspot. As will be appreciated, the centering of the rail segment 78 may be done relative to a cross-sectional profile of the tip rail 50. Specifically, as shown in FIG. 13, the centering of the rail segment 78 may be done in accordance with a width and height of the tip rail 50. As used herein, the width of the tip rail 50 is defined as the distance occurring between the inner rail face 57 and outer rail face 58 of the tip rail 50, while the height of the tip rail 50 is defined as the distance occurring between the tip plate 47 and the outboard rail face 59 of the tip rail 50.

The tip rail 50 is generally formed between opposing outer faces, i.e., the inner rail face 57 and the outer rail face 58, which each extends at a steep angle from and relative to the tip plate 47. As will be appreciated, the inner rail face 57 is so called because it faces inward toward the tip cavity 55. The tip cavity 55 is further defined by a floor 87, which, as indicted in FIG. 13, is an outboard surface of the tip plate 47. The outboard rail face 59 may connect the inner rail face 57 and the outer rail face 58 and thereby define an outer radially most edge or face of the tip rail 50. Further, sections of the tip rail 50, as already described, may be differentiated into a pressure tip rail 52 and suction tip rail 53. As will be appreciated, the pressure tip rail 52 extends along a periphery of the tip plate 47 that overhangs the outboard edge of the pressure face 26 of the airfoil 25, while the suction tip rail 53 extends along a periphery of the tip plate 47 that overhangs the outboard edge of the suction face 27 of the airfoil 25.

Figure 11:
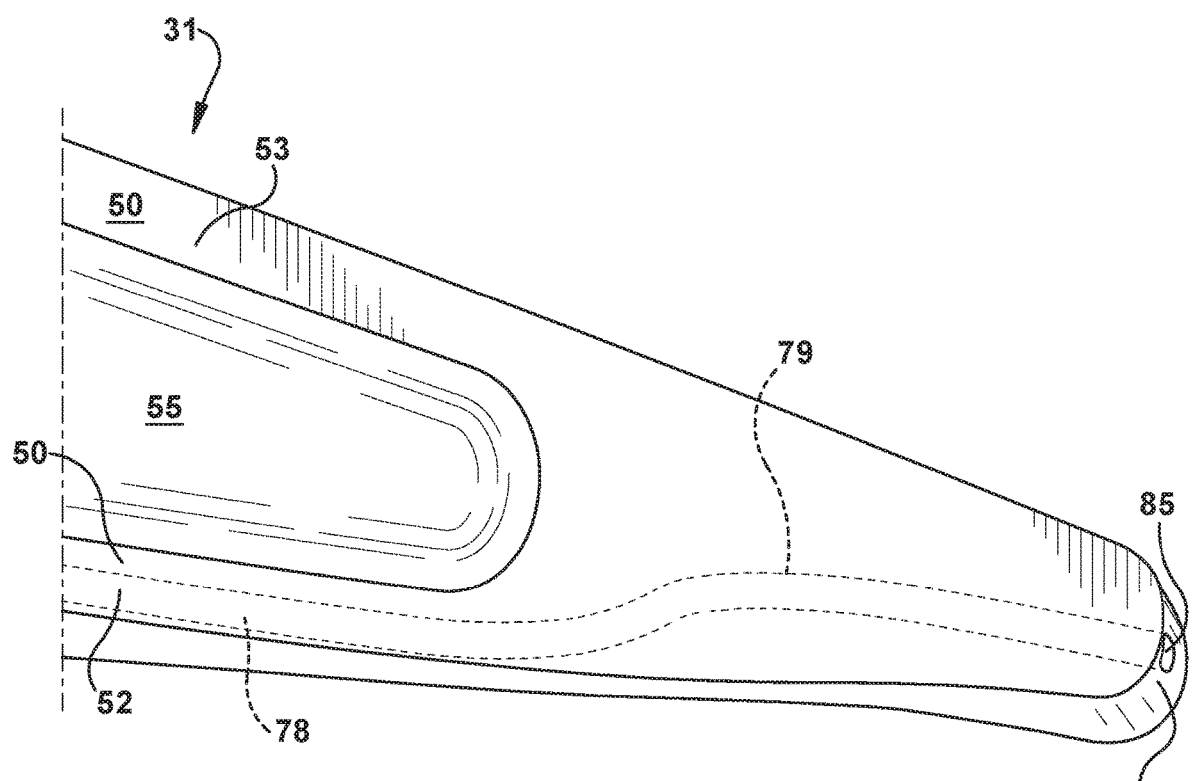
FIG. 11 is a transparent perspective view of a particular region of the outboard tip of the rotor blade shown in FIG. 10.
Figure 12:
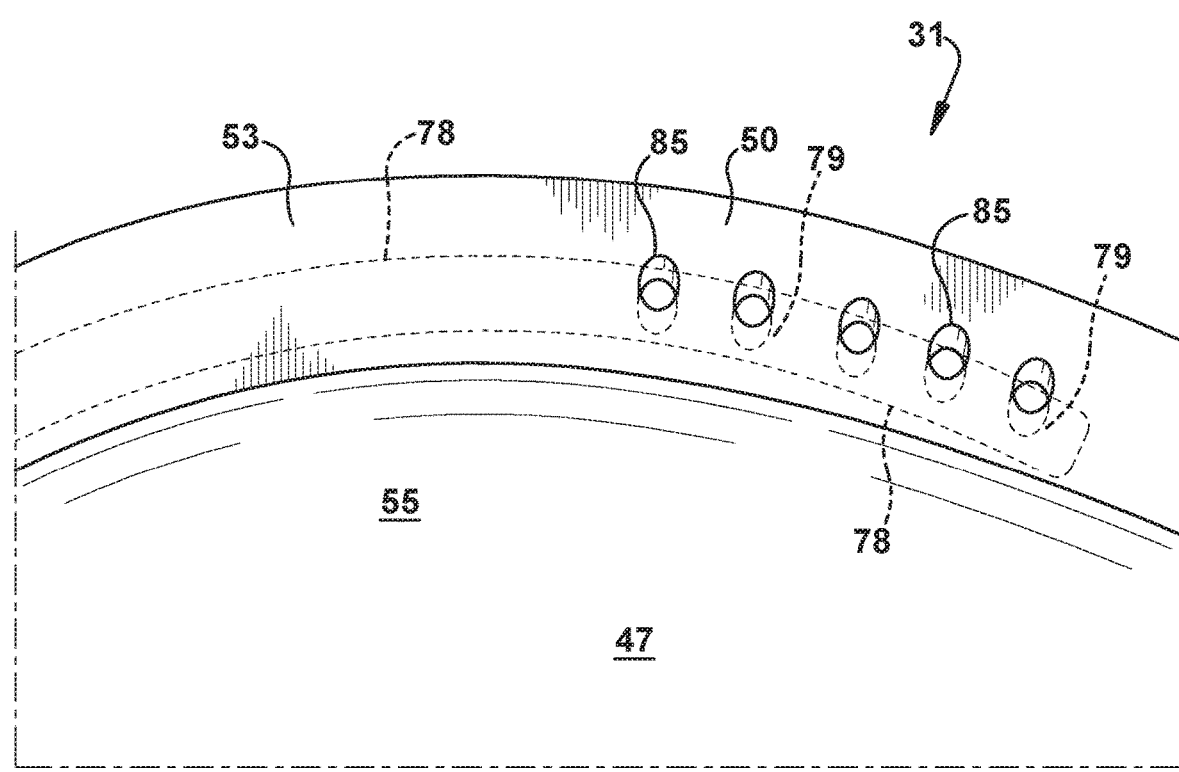
FIG. 12 is a transparent perspective view of another region of the outboard tip of the rotor blade shown in FIG. 10.

According to exemplary embodiments of the present invention, the cooling configuration includes at least one of the above-defined cooling channels 75. The several advantages of such cooling channels 75, particularly the rail segment 78 thereof, have already been discussed above. In alternative embodiments, the cooling configuration of the present disclosure may include two or more of the above-defined cooling channels 75. In such cases, as shown in FIGS. 10 through 13, a first cooling channel 75 may include a rail segment 78 that is formed through the suction tip rail 53, while a second cooling channel 75 includes a rail segment 78 that is formed through the pressure tip rail 52. As indicated, the outer surface of the tip rail 50 on which the downstream outlets 85 of the outlet segments 79 are formed may include the outboard rail face 59 and the inner rail face 57 of the tip rail 50. Though not shown, the downstream outlets 85 may be formed through the outer rail face 58 also. As depicted in FIGS. 12 and 13, the first cooling channel 75 includes downstream outlets 85 formed through the outboard rail face 59 of the suction tip rail 53. As shown in FIG. 13, the second cooling channel 75 includes downstream outlets 85 formed through the inner rail face 59 of the pressure tip rail 52.

As FIG. 10 further indicates, the cooling configuration of the present invention may include three of the above-defined cooling channels 75. In such cases, a third cooling channel 75 may be included along with, for example, the first and second cooling channels 75 already discussed above. As shown, the rail segment 78 of the third cooling channel 75 may extend through the pressure tip rail 52. Alternatively, the rail segment 78 of the third cooling channel 75 may have been located on the suction tip rail 53. As depicted, the rail segment 78 of the second cooling channel 75 and the rail segment 78 of the third cooling channel 75 may be axially stacked and non-overlapping in configuration within the pressure tip rail 52. Other configurations are also possible. The rail segment 78 of the second cooling channel 75 may be positioned forward of the rail segment 78 of the third cooling channel, and together the rail segments 78 of the second and third cooling channels 75 may extend to cover a majority or most of the length of the pressure tip rail 52.

As already described, a trailing edge of the tip rail 50 is defined as the trailing edge interface at which the pressure tip rail 52 and the suction tip rail 53 intersect or connect. As shown in FIGS. 10 and 11, the third cooling channel 75 includes downstream outlets 85 formed through the trailing edge 61 of the tip rail 50. As will be appreciated, alternative embodiments include the addition of other cooling channels 75, such as, for example, a fourth cooling channel 75 having another of the rail segments 78 formed through the suction tip rail 53.

The above-described cap section 72 of the airfoil may be manufactured using any now known or later developed technologies, e.g., machining, casting, etc. With specific reference now to FIG. 14, in one preferred embodiment, the cap section 72 is manufactured by an additive manufacturing process. As used herein, additive manufacturing (also "AM") may include any process of producing an object through the successive layering of material rather than the removal of material, which is the case with conventional processes. As will be appreciated, additive manufacturing can create complex geometries without the use of any sort of tools, molds or fixtures, and with little or no waste material. Instead of machining components from solid billets of metal, much of which is cut away and discarded, the only material used in additive manufacturing is what is required to shape the part. Additive manufacturing processes may include but are not limited to: 3D printing, rapid prototyping (RP), direct digital manufacturing (DDM), selective laser melting (SLM) and direct metal laser melting (DMLM). In the current setting, DMLM has been found advantageous.

Figure 14:
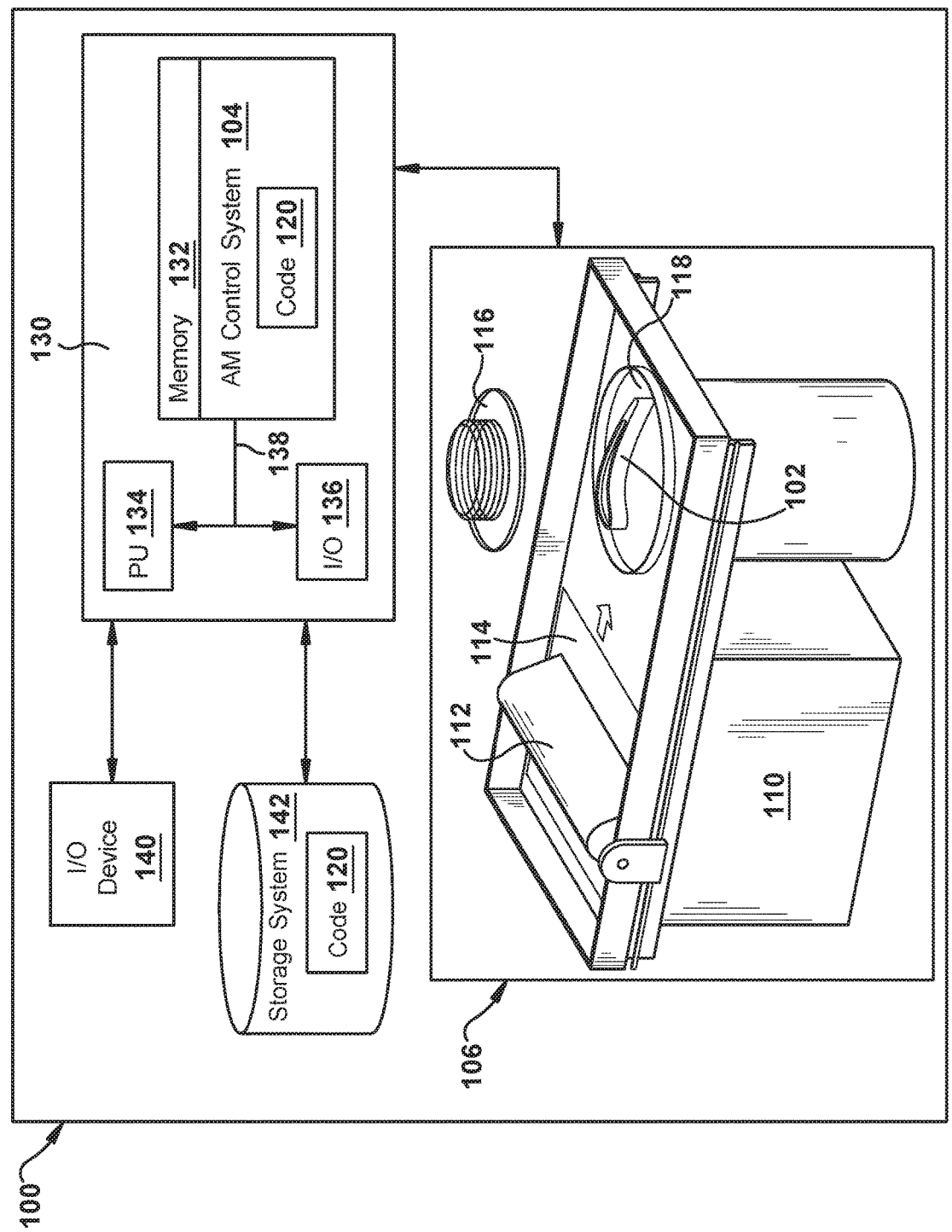
FIG. 14 shows a diagram of an additive manufacturing process including a non-transitory computer readable storage medium storing code representative of a rotor blade in accordance with embodiments of the present invention.

To illustrate an example additive manufacturing process, FIG. 14 shows a schematic/block view of an illustrative computerized additive manufacturing (AM) system 100 for manufacturing an object 102. In this example, the system 100 is arranged for DMLM. It is understood that the general teachings of the disclosure are equally applicable to other forms of additive manufacturing. The object 102 is illustrated as the cap section 72 of an airfoil of a rotor blade, as described above, and it should be understood that the additive manufacturing process can be readily adapted to manufacture any of the variations discussed in relation to FIGS. 10 through 13. The AM system 100 generally includes a computerized additive manufacturing (AM) control system 104 and an additive manufacturing (AM) printer 106. The AM system 100, as will be described, executes code 120 that includes a set of computer-executable instructions defining the cap section 72 to physically generate it using the AM printer 106. As will be appreciated, each additive manufacturing process may use different raw materials in the form of, for example, fine-grain powder, liquid (e.g., polymers), sheet, etc., a stock of which may be held in a chamber 110 of the AM printer 106. In the instant case, the object 102 may be made of any conventional airfoil material such as nickel based alloys, ceramics or other suitable materials for turbine blade applications. As illustrated, an applicator 112 may create a thin layer of raw material 114 spread out as the blank canvas from which each successive slice of the final object will be created. In other cases, the applicator 112 may directly apply or print the next layer onto a previous layer as defined by code 120, e.g., where the material is a polymer. In the example shown, a laser or electron beam 116 fuses particles for each slice, as defined by code 120. Various parts of the AM printer 106 may move to accommodate the addition of each new layer, e.g., a build platform 118 may lower and/or the chamber 110 and/or the applicator 112 may rise after each layer.

The AM control system 104 is shown implemented on a computer 130 as computer program code. To this extent, the computer 130 is shown including a memory 132, a processor (PU) 134, an input/output (I/O) interface 136, and a bus 138. Further, the computer 130 is shown in communication with an external I/O device/resource 140 and a storage system 142. In general, the processor 134 executes computer program code, such as the AM control system 104, that is stored in memory 132 and/or storage system 142 under instructions from code 120 representative of the object 102, described herein. While executing computer program code, the processor 134 can read and/or write data to/from the memory 132, storage system 142, I/O device 140 and/or AM printer 106. The bus 138 provides a communication link between each of the components in the computer 130, and the I/O device 140 can be any device that enables a user to interact with computer 140 (e.g., keyboard, pointing device, display, etc.). The computer 130 is only representative of various possible combinations of hardware and software. For example, the processor 134 may be a single processing unit, or be distributed across one or more processing units in one or more locations, e.g., on a client and server. Similarly, memory 132 and/or storage system 142 may reside at one or more physical locations. Memory 132 and/or storage system 142 can be any combination of various types of non-transitory computer readable storage medium including magnetic media, optical media, random access memory (RAM), read only memory (ROM), etc. The computer 130 can be any type of computing device such as a network server, a desktop computer, a laptop, a handheld device, a mobile phone, a pager, a personal data assistant, etc.

The additive manufacturing processes begin with a non-transitory computer readable storage medium (e.g., memory 132, storage system 142, etc.) storing code 120 representative of the object 102. As noted, code 120 includes a set of computer-executable instructions defining the outboard cap that can be used to physically generate it upon execution of code 120 by the system 100. For example, code 120 may include a precisely defined 3D model of the outboard airfoil section and can be generated from any of a large variety of well-known computer aided design (CAD) software systems such as AutoCAD®, TurboCAD®, DesignCAD 3D Max, etc. In this regard, code 120 can take any now known or later developed file format. For example, code 120 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. The code 120 may be translated between different formats, converted into a set of data signals and transmitted, received as a set of data signals and converted to code, stored, etc., as necessary. The code 120 may be an input to the system 100 and may come from a part designer, an intellectual property (IP) provider, a design company, the operator or owner of the system 100, or from other sources. In any event, the AM control system 104 executes code 120, dividing object 102 into a series of thin slices that it assembles using the AM printer 106 in successive layers of liquid, powder, sheet or other material. In the DMLM example, each layer is melted to the exact geometry defined by code 120 and fused to the preceding layer.

According to alternative embodiments, the cap section 72 may be printed directly onto the body section 71 of the airfoil. In such cases, the body section 71 of the airfoil may be made pursuant to conventional casting processes. As already stated, the body section 71 of the airfoil and the root of the rotor blade may be cast together as an integral component. For this alternative, the body section 71 may be placed within the AM printer 106 so that the cap section 72 can be printed directly on to it.

Additionally, subsequent to the additive manufacture of the cap section 72, the cap section 72 may be exposed to any variety of finishing processes, e.g., machining, drilling, sealing, polishing, etc. For example, in one embodiment, a cost-effective post-fabrication drilling process is used to add the outlet segments to cooling configuration within the cap section 72 of the airfoil. This may be accomplished by a relatively simple line-of-sight drilling process that begins at a predetermined location on an outer surface of the tip rail and continues until one of the rail segments is intersected in a desired manner.

When the cap section 72 and the body section 71 are manufactured as separate components, a final step of the present method includes connecting them so that the airfoil is complete. The two components may be connected via any conventional process. Preferred embodiments include welding, brazing, some form of mechanical interference fitting, and/or some combination thereof.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for use in combustion turbine engine, the rotor blade comprising:
   an airfoil assembled from two radially stacked non-integral sections in which a body section resides inboard of a cap section;
   an outboard tip of the airfoil that is enclosed by a tip plate and, formed along a periphery of the tip plate, a tip rail, the tip rail having an inner rail face, an outer rail face opposite the inner rail face, and an outboard rail surface opposite the tip plate and extending between the inner rail face and the outer rail face; and
   a cooling configuration that includes one or more cooling channels for receiving and directing a coolant through an interior of the rotor blade, each of the one or more cooling channels comprising fluidly communicative segments, in which:
- a supply segment extends radially through the airfoil, the supply segment being radially defined between a floor, which comprises an inboard boundary, and a ceiling, which comprises an outboard boundary;
- a rail segment extends in a chordwise direction through an interior of the tip rail; and
- a connecting segment extends between the supply segment and the rail segment, the connecting segment comprising an upstream port, which connects to the supply segment, and a downstream port, which connects to the rail segment;
- wherein, for each of the one or more cooling channels: the ceiling of the supply segment is defined within the cap section of the airfoil, and the rail segment is substantially centered within the tip rail in accordance with:
  - a width of the tip rail, the width of the tip rail being defined as a distance occurring between the inner rail face and outer rail face of the tip rail; and
  - a height of the tip rail, the height of the tip rail being defined as a distance occurring between the tip plate and the outboard rail face,
  - wherein the rail segment extends in the chordwise direction along substantially an entirety of a length of the tip rail.

2. The rotor blade according to claim 1, wherein the rotor blade comprises a turbine rotor blade;
wherein the airfoil extends radially between an inboard end and the outboard tip, wherein:
- the inboard end of the airfoil is defined by an inboard edge of the body section; and
- the outboard tip of the airfoil is defined by an outboard edge of the cap section;

wherein each of the one or more cooling channels further comprises outlet segments at distinct locations in the chordwise direction, each of the outlet segments configured to extend between an upstream port, which connects to the rail segment, and a downstream port, which forms an outlet on an outer surface of the tip rail; and wherein, for each of the one or more cooling channels, the supply segment extends radially uninterrupted between a first position disposed within the body section of the airfoil and a second position disposed within the cap section of the airfoil.

3. The rotor blade according to claim 2, wherein the floor of the supply segment is defined within the body section; and wherein:
- each of the body section and the cap section comprises radially defined sections of the airfoil that together form an entirety of the airfoil;
- a radial height of the airfoil comprises a distance between the inboard end and the outboard tip of the airfoil, wherein the body section comprises a first percentage of the radial height of the airfoil and the cap section comprises a second percentage of the radial height of the airfoil; and
- the first percentage comprises at least 90% and the second percentage comprises at least 5%.

4. The rotor blade according to claim 2, wherein the airfoil comprises a concave pressure face and a laterally opposed convex suction face, the pressure face and the suction face extending axially between opposed leading and trailing edges of the airfoil, wherein the inboard end of the airfoil attaches to a root that is configured for coupling the rotor blade to a rotor disc;
wherein:
- each of the body section and the cap section comprises radially defined sections of the airfoil that together form an entirety of the airfoil;
- a radial height of the airfoil comprises a distance between the inboard end and the outboard tip of the airfoil, wherein the body section comprises a first percentage of the radial height of the airfoil and the cap section comprises a second percentage of the radial height of the airfoil; and
- the first percentage comprises at least 85% and the second percentage comprises at least 3%.

5. The rotor blade according to claim 4, wherein the pressure face and suction face of the airfoil each comprises an outboard edge, wherein the tip plate comprises a planar component that extends axially and circumferentially to connect the outboard edge of the suction face to the outboard edge of the pressure face;
- wherein the tip rail is defined by opposing sidewalls that extend relative to the tip plate and, connecting the opposing sidewalls, the outboard rail face that defines a radially outermost edge of the tip rail, the opposing sidewalls comprising the inner rail face and the outer rail face;
- wherein the tip rail includes a pressure tip rail and a suction tip rail, wherein:
  - the pressure tip rail extends along a periphery of the tip plate that overhangs the outboard edge of the pressure face of the airfoil; and
  - the suction tip rail extends along a periphery of the tip plate that overhangs the outboard edge of the pressure face of the airfoil.

6. The rotor blade according to claim 1, wherein a pressure face and a suction face of the airfoil each comprises an outboard edge, wherein the tip plate comprises a planar component that extends axially and circumferentially to connect the outboard edge of the suction face to the outboard edge of the pressure face; wherein the inner rail face and the outer rail face define opposing sidewalls of the tip rail;
- wherein the tip rail includes a pressure tip rail extending along a periphery of the tip plate that overhangs the outboard edge of the pressure face of the airfoil and a suction tip rail extending along a periphery of the tip plate that overhangs the outboard edge of the suction face of the airfoil, and wherein a tip cavity is defined between the inner rail faces of each of the pressure tip rail and the suction tip rail;
- wherein an outboard surface of the tip plate defines a floor of the tip cavity;
- wherein, for each of the one or more cooling channels, the rail segment is configured having a longitudinal axis that is generally parallel to a longitudinal axis of the tip rail through which the rail segment extends such that the rail segments extend along substantially an entirety of a length of the tip rail.

7. The rotor blade according to claim 6, wherein, for each of the one or more cooling channels, the rail segment extends from a first position to a second position, the first position comprising a position closer to the leading edge of the airfoil than the second position; and
- wherein, for each of the one or more cooling channels, the first position of the rail segment is upstream of the second position of the rail segment in relation to an expected direction of flow of the coolant through the rail segment during normal operation.

8. The rotor blade according to claim 7, wherein the cooling configuration comprises at least two of the one or more cooling channels: a first cooling channel and a second cooling channel; wherein:
the rail segment of the first cooling channel extends through the suction tip rail; and
the rail segment of the second cooling channel extends through the pressure tip rail.

9. The rotor blade according to claim 8, wherein:
each of the one or more cooling channels further comprises outlet segments at distinct locations in the chordwise direction, each of the outlet segments forming an outlet on an outer surface of the tip rail;
the outer surface of the tip rail on which the outlets of the outlet segments of the first cooling channel are formed comprises the outboard rail face of the suction tip rail; and
the outer surface of the tip rail on which the outlets of the outlet segments of the second cooling channel are formed comprises the inner rail face of the pressure tip rail.

10. The rotor blade according to claim 8, wherein the cooling configuration comprises at least three of the one or more cooling channels: the first cooling channel; the second cooling channel; and a third cooling channel;
wherein the rail segment of the third cooling channel extends through the pressure tip rail; and
wherein the rail segment of the second cooling channel and the rail segment of the third cooling channel comprise a non-overlapping axially stacked configuration in which the rail segment of the second cooling channel is positioned forward of the rail segment of the third cooling channel.

11. The rotor blade according to claim 10, wherein a trailing edge of the tip rail comprises an interface formed between the pressure tip rail and the suction tip rail; wherein:
the outer surface of the tip rail on which the outlets of the outlet segments of the first cooling channel are formed comprises one of the outboard rail face and the inner rail face of the tip rail;
the outer surface of the tip rail on which the outlets of the outlet segments of the second cooling channel are formed comprises one of the outboard rail face and the inner rail face of the tip rail; and
the outer surface of the tip rail on which the outlets of the outlet segments of the third cooling channel are formed comprises the trailing edge of the tip rail.

12. The rotor blade according to claim 8, wherein:
the body section of the airfoil is integrally formed with the root via a casting process; and
the cap section of the airfoil is constructed via an additive manufacture process.

13. A method of manufacturing an airfoil of a rotor blade for use in a combustion turbine engine, wherein the airfoil comprises a body section and a cap section, wherein the airfoil extends radially between an inboard end, which is defined by the body section, and an outboard tip, which is defined by the cap section, the method comprising the steps of:
generating a digital model of the cap section;
inputting the digital model of the cap section into an additive manufacturing machine;
using the additive manufacturing machine to print the cap section based on the digital model;
joining the cap section to the body section of the airfoil, wherein the airfoil comprises: the outboard tip that includes a tip plate and a radially protruding tip rail that is formed along a periphery of the tip plate; and a cooling configuration that includes one or more cooling channels for receiving and directing a coolant through an interior of the rotor blade, each of the one or more cooling channels comprising fluidly communicative segments, in which: a supply segment extends radially through the airfoil, the supply segment being defined radially between a floor, which comprises an inboard boundary, and a ceiling, which comprises an outboard boundary; a rail segment extends through an interior of the tip rail; and a connecting segment extends between the supply segment to the rail segment, the connecting segment comprising an upstream port, which connects to the supply segment, and a downstream port, which connects to the rail segment; wherein, for each of the one or more cooling channels, the ceiling of the supply segment is defined within the cap section, wherein each of the one or more cooling channels further comprises outlet segments, each of the outlet segments configured to extend between an upstream port, which connects to the rail segment, and a downstream port, which forms an outlet on an outer surface of the tip rail; and
drilling the outlet segments after the cap section is printed.

14. The method according to claim 13, wherein the rotor blade further comprises a root having a dovetail configured to connect the rotor blade to a rotor disc;
further comprising the step of manufacturing the body section and the root as integral components via a casting process.

15. The method according to claim 14, wherein the step of printing the cap section and the step of joining the cap section are performed together by printing the cap section directly onto the body section.

16. The method according to claim 14, wherein the step of printing the cap section comprises printing the cap section as an unattached component relative to the body section prior to the step of joining the cap section to the body section.

17. A rotor blade for use in combustion turbine engine, the rotor blade comprising:
an airfoil assembled from two radially stacked non-integral sections in which a body section resides inboard of a cap section;
an outboard tip of the airfoil that is enclosed by a tip plate and, formed along a periphery of the tip plate, a tip rail; and
a cooling configuration that includes one or more cooling channels for receiving and directing a coolant through an interior of the rotor blade, each of the one or more cooling channels comprising fluidly communicative segments, in which:
a supply segment extends radially through the airfoil, the supply segment being radially defined between a floor, which comprises an inboard boundary, and a ceiling, which comprises an outboard boundary;
a rail segment extends through an interior of the tip rail; and
a connecting segment extends between the supply segment and the rail segment, the connecting segment comprising an upstream port, which connects to the supply segment, and a downstream port, which connects to the rail segment;
wherein, for each of the one or more cooling channels:

the ceiling of the supply segment is defined within the cap section of the airfoil, and the rail segment is substantially centered within the tip rail in accordance with:

a width of the tip rail, the width of the tip rail being defined as a distance occurring between the inner rail face and outer rail face of the tip rail; and a height of the tip rail, the height of the tip rail being defined as a distance occurring between the tip plate and the outboard rail face, wherein the rail segment extends in a chordwise direction along a length of the tip rail.

* * * * *